United States Patent
Kalish et al.

(10) Patent No.: US 6,952,517 B2
(45) Date of Patent: Oct. 4, 2005

(54) METHOD FOR THE MANUFACTURE OF OPTICAL FIBERS, IMPROVED OPTICAL FIBERS, AND IMPROVED RAMAN FIBER AMPLIFIER COMMUNICATION SYSTEMS

(75) Inventors: David Kalish, Roswell, GA (US); Jinkee Kim, Norcross, GA (US); Robert Lingle, Jr., Norcross, GA (US); Yifei Qian, Alpharetta, GA (US)

(73) Assignee: Furukawa Electric North America, Norcross, GA (US)

( * ) Notice: Subject to any disclaimer, the term of this patent is extended or adjusted under 35 U.S.C. 154(b) by 189 days.

(21) Appl. No.: 10/353,762

(22) Filed: Jan. 29, 2003

(65) Prior Publication Data

US 2004/0146259 A1 Jul. 29, 2004

(51) Int. Cl.$^7$ ............................ G02B 6/02; C03B 37/02
(52) U.S. Cl. ........................................ 385/124; 65/435
(58) Field of Search ............. 65/385–436; 385/123–124

(56) References Cited

U.S. PATENT DOCUMENTS

| | | | | |
|---|---|---|---|---|
| 4,715,679 A | * | 12/1987 | Bhagavatula | ............... 385/127 |
| 6,405,566 B1 | * | 6/2002 | Oh | ............................. 65/412 |
| 6,611,647 B2 | * | 8/2003 | Berkey et al. | ............. 385/123 |
| 2002/0006259 A1 | * | 1/2002 | Tirloni | ...................... 385/127 |
| 2002/0197036 A1 | * | 12/2002 | Kim et al. | .................. 385/123 |
| 2004/0028359 A1 | * | 2/2004 | Tirloni et al. | .............. 385/123 |

* cited by examiner

*Primary Examiner*—Akm Enayet Ullah
*Assistant Examiner*—Jerry T. Rahll
(74) *Attorney, Agent, or Firm*—Peter V. D. Wilde

(57) ABSTRACT

The specification describes an improved optical fiber design in which the criteria for high performance in a Raman amplified optical system, such as moderate effective area, moderate dispersion, low dispersion slope, and selected zero dispersion wavelength, are simultaneously optimized. In preferred embodiments of the invention, the dispersion characteristics are deliberately made selectively dependent on the core radius. This allows manufacturing variability in the dispersion properties, introduced in the core-making process, to be mitigated during subsequent processing steps.

11 Claims, 8 Drawing Sheets

METHOD FOR THE MANUFACTURE OF OPTICAL FIBERS, IMPROVED OPTICAL FIBERS, AND IMPROVED RAMAN FIBER AMPLIFIER COMMUNICATION SYSTEMS

FIELD OF THE INVENTION

This invention relates to optical fibers having improved optical transmission characteristics, methods for their production, and communication systems incorporating the improved optical fibers.

BACKGROUND OF THE INVENTION

Optical transmission systems employ Wavelength Division Multiplexing (WDM) to increase information handling of an optical fiber transmission line, typically a long haul transmission line. Early WDM systems operated with a relatively narrow wavelength bandwidth, centered around 1550 nanometers, e.g. 1530–1565 nanometers, referred to as the C-band. This is the wavelength region where standard silica based optical fibers have optimally low absorption.

In most WDM systems there is a trade-off between the number of channels the system accommodates and the channel separation. Higher bit rates generally call for an increase in channel spacing. Both goals favor a wide operating spectrum, i.e. a wide range of operating wavelengths.

Recently, systems have been designed that extend the effective operating wavelength range well above the C-band transmission band. In terms of wavelength, the new band, referred to as the L-band, is variously defined, but for the purpose of this description is 1570–1610 nanometers. Substantial work has also been done in the S-band, defined as 1460–1530nm. Use of these added wavelengths substantially extends the capacity of WDM systems. There is an ongoing effort to further extend the effective operating wavelength window to above 1610 nm, for example to 1620 nm. Success of these efforts will depend on finding components, for example amplifiers, that provide effective operation over this broad wavelength range. It is now well appreciated that a transmission fiber should have a minimum level of dispersion at signal wavelengths to enable WDM transmission by suppressing four wave mixing impairments. Since the dispersion of a non-zero dispersion-shifted NZDF typically increases toward longer wavelength, this requirement implies that the zero dispersion wavelength should be 20–40 nanometers lower than the shortest wavelength intended for WDM.

In WDM systems, it is important to have uniform gain over the entire WDM wavelength band. This objective becomes more difficult to reach as the operating wavelength range is extended to longer and/or shorter wavelengths. Recently, new types of optical fiber amplifiers have been developed that operate using stimulated Raman scattering. The most prominent of these is a distributed amplifier that operates over the normal transmission span as a traveling wave amplifier. Raman scattering is a process by which light incident on a medium is converted to light at a lower frequency (Stokes case) than the incident light. The pump photons excite the molecular vibrations of the medium up to a virtual level (non-resonant state). The molecular state quickly decays to a lower energy level emitting a signal photon in the process. Because the pump photon is excited to a virtual level Raman gain can occur for a pump source at any wavelength. The difference in energy between the pump and signal photons is dissipated by the molecular vibrations of the host material. These vibrational levels determine the frequency shift and shape of the Raman gain curve. The frequency (or wavelength) difference between the pump and the signal photon is called the Stokes shift. In Ge-doped silica fibers, the Stokes shift at which the maximum gain is obtained is ~13 THz. Due to the amorphous nature of silica the Raman gain curve is fairly broad in optical fibers.

Since Raman scattering can occur at any wavelength, this can be exploited to advantage in a telecommunication system that contains multiple signal wavelengths by using Raman pumps at several different wavelengths to amplify the signals. The gain seen by a given wavelength is the superposition of the gain provided by all the pumps, taking into account the transfer of energy between the pumps due to Raman scattering. By properly weighting the power provided at each of the Raman pump wavelengths it is possible to obtain a signal gain versus wavelength profile in which there is a small difference between the gain seen by different signal wavelengths (this difference is called the gain ripple or gain flatness). The use of Raman amplification thus enables dense WDM (DWDM) outside the erbium window. Raman amplification is also an enabling technology for the evolution from 10 to 40 Gb/s transmission because it improves optical signal to noise ratio at lower launch powers.

A multiplicity of pumps has been used successfully in many systems. However there is one persistent problem with multiple pumps. An unwanted nonlinear effect called four-wave mixing (FWM) may sometimes occur. In telecommunications systems, if FWM occurs in the signal band this can lead to transmission errors. As the number of pumps in a multi-pump wavelength Raman amplification scheme increases, the likelihood of FWM increases.

The harmful effects of four-wave mixing have been recognized. Recently one approach towards reducing these effects has been proposed [EP 1 148 666 A2]. In this approach the pump wavelengths are either time division multiplexed (TDM) together, or the frequency of the pump source is modulated (FM). Since the various pump wavelengths overlap for only a small distances along the fiber, FWM between the pump wavelengths should be eliminated or severely reduced.

While this approach would eliminate FWM, the nominal pump power requirements in this system are relatively high. Moreover, to TDM a relatively large number of pump wavelengths, some operating at relatively high power, adds significantly to the cost and complexity of the system. Other approaches to reducing FWM and other non-linear effects would significantly advance the art.

At least equally as important as compatibility with amplifier technology in the design of optical fibers for high bit rate, wide-band, systems is management of chromatic dispersion. This problem grows significantly as the data bit rate is increased. An optical transmission line, comprising a cabled fiber and a dispersion compensation element (typically a module but possibly a cabled fiber), that transmits effectively at 10 Gb/s may show excessive error rates at 40 Gb/s because of bit overlap. For non-return-to-zero modulation, a 10 Gb/s system should accumulate less than ~1000 ps/nm chromatic dispersion over the total link distance; for a 40 Gb/s system this requirement is tightened to less than 60 ps/nm.

This requirement is met by a combination of two methods. First, in NZDF fibers, dispersion is reduced in the C-band below that of standard matched clad fiber. To gain this benefit over multiple bands, it is advantageous that the slope of the dispersion be low. Second, dispersion compensation technology is employed, most commonly in the form of a dispersion compensating fiber (DCF) in a module. For broadband operation, it is important that the dispersion curve of the DCF "match" that of the transmission fiber in the appropriate sense. In general, precise compensation of chromatic dispersion over a broad band is achieved when the ratio of the dispersion slope to the dispersion at band center is equal for the fiber and DCF. Furthermore, the best results are obtained when this ratio is low. This further emphasizes the advantage of reduced dispersion slope.

A problem arises in designing optical fibers to meet this general need: typical optical fiber profiles that are optimized for low dispersion slope have reduced effective area due to bend loss constraints. Optical fibers with reduced effective area generally show increased and unwanted non-linear effects including four-wave mixing as well as self- and cross-phase modulation (SPM, XPM). For Raman amplified systems, too small effective area exacerbates the issues of "Raman gain tilt" whereby shorter wavelength pumps (signals) transfer energy to longer wavelength pumps (signals).

Thus the manufacture of optical fibers for high bit rate (e.g. 40 Gb/s) systems and with both low dispersion slope and medium or large effective area, while at the same time preserving other performance characteristics such as low Polarization Mode Dispersion (PMD), is a design challenge.

STATEMENT OF THE INVENTION

Trade-offs in the parameters just noted to yield improved optical transmission performance have been achieved. The improved optical fiber of the invention exhibits these characteristics:

Dispersion at 1550 nm: 6–8.5, pref. 6.5–7.8, and pref. 7.3+/−2.0, ps/nm-km

Dispersion slope at 1550 nm: <0.045 ps/nm$^2$-km, pref <0.042 ps/nm$^2$-km

Effective area at 1550 nm: >50, pref. 54–62, and pref. 54–58 $\mu m^2$

Cable cutoff wavelength: <1410 nm

Microbend loss (32 mm) at 1625 nm: <5×10$^3$ dB/km

Zero dispersion wavelength: <1400 nm

This set of properties in general represents optical fibers with moderate chromatic dispersion and moderate effective area to minimize non-linear effects, and low dispersion slope for ease of precise, wideband, dispersion compensation. It also represents fibers designed for distributed Raman amplification and/or S-, C-, and L-band operation while at the same time being compatible with erbium-doped fiber amplifiers (EDFAs).

A variety of optical fiber refractive index profiles that produce these transmission characteristics have been designed. In general these have a complex core comprising an up-doped central core (usually referred to as the core), surrounded by a down-doped region (usually referred to as the trench), further surrounded by an up-doped region (referred to as the ring). A similar basic profile (but with different performance characteristics) is described and claimed in U.S. Pat. Nos. 5,878,182, and 5,905,838, which are incorporated herein by reference. In advanced fiber designs, the profile may also have a second down-doped trench, width a width of, for example, 2–10 microns, added either just outside the ring, or farther out in the cladding, in order to adjust the cutoff wavelength, and reduce microbending loss.

In the preferred manufacturing method, the size of the core region is adjusted during manufacture to achieve the design objectives. The optical parameters of the fiber are specifically designed so that the dispersion characteristics of the fiber are selectively dependent on the core radius. This allows the dispersion characteristics to be selectively adjusted by changing the core radius during manufacture. The preferred manufacturing methods employ rod-in-tube techniques for making the optical fiber preform. After forming the core rod, it rod may be subjected to a plasma treatment, or other suitable process step, to modify the core diameter.

In a preferred embodiment of the invention the core rod is made using an MCVD method and the core consequently exhibits a so-called alpha profile, with an index that varies with core radius, and a maxima in the center half of the core (the first half of the core radius measured from the core center). However, optical fibers meeting the performance parameters of the invention, may have any suitable refractive index profile, and may be manufactured by any of a variety of methods, such as for example, OVD, VAD, PCVD, POVD, MCVD. Combinations of the above methods may be used for fabricating the various regions of the index profile and overclad regions as appropriate, including the incorporation of soot-on-glass, soot-on-soot, or glass-on-glass interfaces in the preform as appropriate.

DETAILED DESCRIPTION

Figure 1:
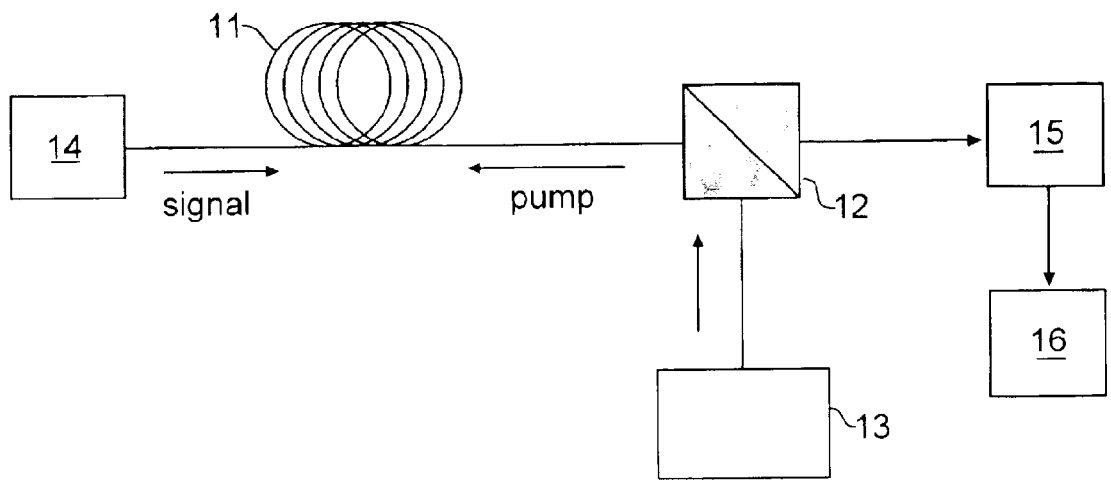
FIG. 1 is a simplified diagram of an optical communications system with a Raman optical fiber amplifier and an optical fiber designed according to the invention.

Referring to FIG. 1, an optical fiber communications system is shown with a distributed Raman optical fiber amplifier. The transmission span 11 represents a fiber of substantial length, typically in excess of 1 km. It will be evident to those skilled that the figures in this description are not drawn to scale, and the elements are schematically shown. For purposes of illustration, FIG. 1 shows a distributed amplifier where the amplifier medium is the normal transmission span. For discrete amplifiers, a dedicated length of optical fiber can be used for the amplification medium. The length of fiber represented by 11 is typically at least 500 m in length to allow for the optical interactions that produce signal amplification. The amplifier is end pumped, and counterpumped, as shown in the figure, by pump source 13 coupled into the core of the fiber through coupler shown schematically at 12. The system transmitter is shown at 14 and the system receiver at 16. A dispersion compensating module may be included at 15.

Optical fiber Raman amplifiers operate on the principle that light scattered in a silica based optical fiber has a wavelength lower than that of the incident light. Pump photons excite molecules up to a virtual level (non-resonant state). The excited molecules quickly decay to a lower energy level (Stoke's case) emitting signal photons in the process. Because the pump photon is excited to a virtual level, Raman gain can occur for a pump source at any wavelength. The difference in energy between the pump and signal photons is dissipated by the molecular vibrations of the host material. These vibrational levels determine the frequency shift and shape of the Raman gain curve. The frequency (or wavelength) difference between the pump and the signal photon is called the Stokes shift. In Ge-doped silica fibers, the Stokes shift at which maximum gain is obtained is ~13 THz. Due to the amorphous nature of silica the Raman gain curve is fairly broad in optical fibers.

In a telecommunication system that contains multiple signal wavelengths Raman pumps at several different wavelengths may be used to amplify the signals, since Raman scattering can occur at any wavelength. The gain seen by a given wavelength is the superposition of the gain provided by all the pumps taking into account the transfer of energy between the pumps due to Raman scattering. By properly weighting the power provided at each of the Raman pump wavelengths it is possible to obtain a signal gain versus wavelength profile in which there is a small difference between the gain seen by different signal wavelengths. This difference is called the gain ripple or gain flatness, and may be expressed in dB as (Gmax-Gmin).

Figure 2:
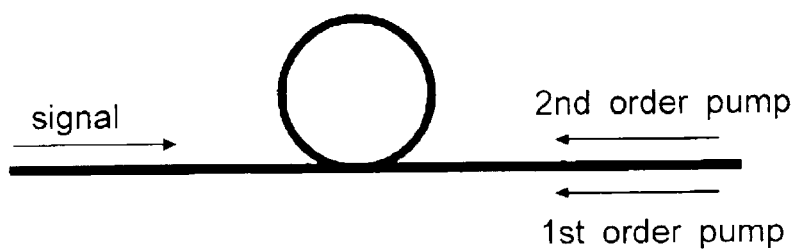
FIGS. 2 and 3 show alternative multiple pump arrangements for the Raman amplifier of FIG. 1.
Figure 3:
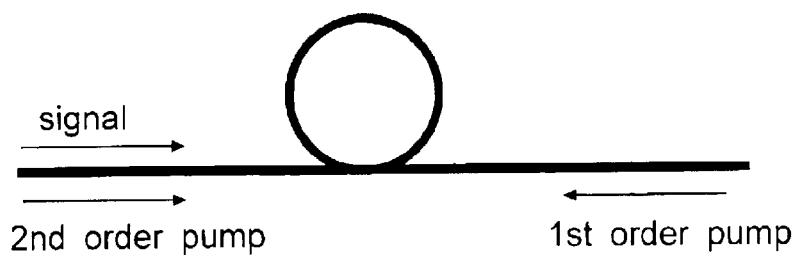

FIG. 1 shows a Raman amplifier system using a single, counter pump. The system may also be co-pumped, with pumps from either direction. The advantages of this approach was recently pointed out in (U.S. Pat. No. 6,163,630). Multiple co- and counter pumps may be multiplexed to improve gain flatness as previously described. In multiple order Raman pumping the signal light is greater than 1.5 Stokes shift away from the maximum gain frequency of the pump light. As an example in $2^{nd}$ order pumping, a pump wavelength 2 Stokes shifts away from the signal light is used to pump a $1^{st}$ order Stokes pump that is 1 Stokes shift away from the signal light. This is illustrated in FIGS. 2 and 3. Two configurations are illustrated. In the first case, FIG. 2, both a $1^{st}$ and $2^{nd}$ order pump are counter pumped relative to the signal light. It takes a finite length of fiber for the $2^{nd}$ order pump to be converted to the 1st order pump. The $1^{st}$ order pump then pumps the signal. This then allows the signal amplification to occur closer to the signal input end of the fiber. In a second embodiment of this approach, the 2nd order pump travels in the same direction as the signal (co-pumped) (FIG. 3), and the first order pump is counter pumped. The 2nd order pump pumps the first order pump at the input end of the fiber, which allows the $1^{st}$ order pump to pump the signal. This again allows the Raman gain to occur closer to the signal input end of the fiber. Multiple order pumping is advantageous because in first order Raman pumping the pump generally travels in the opposite direction of the signal. Most of the amplification occurs near the signal output end of the transmission span. At this position in the fiber the signal power has already significantly degraded. If the Raman gain seen in the fiber can occur closer to the signal input end of the fiber an improved signal to noise ratio (SNR) and noise figure (NF) is obtained. The power needed for a second order pump is fairly modest. In one example of a dual order pumped system, the power ratio for a 1366/1455 nm pump was 970/10 mW respectively.

The use of multiple pumps, however, introduces the problem of four wave mixing (FWM). Four-wave mixing occurs when photons of two or more waves combine to create photons at other frequencies. The new frequencies are determined as such that total energy and momentum (phase matching) is conserved. FWM may result from non-linear interaction between two or more pump wavelengths.

In a telecommunications system, spurious wavelength components resulting from FWM in the signal band may lead to transmission errors. Unlike Raman scattering in which the phase matching conditions are automatically satisfied, the efficiency of FWM depends on a proper choice of frequencies and refractive indices. There are three contributions to the phase mismatch; material dispersion, waveguide dispersion and fiber nonlinearity. By adjusting the location of the zero dispersion wavelength (hence the waveguide dispersion) of the fiber, FWM can be controlled, and in many cases, practically eliminated. In general, it is desirable to have the zero of dispersion at a wavelength shorter than the shortest wavelength pump, so that the dispersion is greater than or equal to 1 or 2 ps/nm/km over the entire region of Raman pumps and signals.

An effective approach towards reducing FWM, SPM, XPM, and interband stimulated Raman effects is to minimize the non-linear properties of the optical fiber itself. This may be achieved by increasing the effective area, $A_{eff}$, of the optical fiber. In doing this, a variety of trade-offs should be considered, including bend losses and cutoff. In general, there is a limit beyond which increasing the effective area, while maintaining acceptable bend losses and cutoff, will sacrifice lower dispersion slope and its attendant benefits previously discussed.

It has been noted that the particular dispersion vs. wavelength curve of an optical fiber design determines how precisely chromatic dispersion can be compensated over a wideband, especially in the case of single-mode dispersion compensating fiber solutions. A relevant and useful parameter is the ratio of the dispersion slope to the dispersion at the central wavelength of the signal band (here called the "relative dispersion slope" or RDS). If the RDS of the cabled transmission fiber (typically with positive dispersion) is equal to the RDS of the negative dispersion compensating fiber (typically housed in a module, but can be cabled as well), then precise cancellation of dispersion can be achieved over a wide range (e.g. +/+15 to 20 nm). In general the best results can be achieved when the transmission fiber has a relatively low value of RDS. First, it is difficult to fabricate dispersion compensating fibers with high RDS. Second, the dispersion vs. wavelength relation for high RDS fibers are typically more curved than for lower RDS fibers, leading to significant error in compensation for 40 Gb/s transmission.

SSMF fiber has RDS ~0.0033/nm at 1550 nm, defining the lower end of the scale. Commercial NZDF fibers with Aeff>50 sq microns have RDS ranging from 0.0065/nm to 0.02/nm at 1550 nm, with full C-band compensation proving very difficult to realize for the high end values of RDS. The present invention advances the state of the art by reducing RDS across the S-, C-, and L-bands, supporting innovation in wideband dispersion compensation solutions. In addition to enabling more precise wide band compensation across the C and L bands, the very low RDS ~0.0050/nm at 1570 makes possible combined C+L band module, while the low RDS ~0.0075/nm at 1510 nm enables compensation in the upper S-band. A desirable prescription for RDS over the bands of interest is:

0.0064 to 0.0082 per nm at a wavelength of approximately 1510 nm (S-band application)

0.0046 to 0.0058 per nm at a wavelength of approximately 1550 nm (C-band application)

00.42 to 00.54 per nm at a wavelength of approximately 1570 nm (C+L band compensation with combined module)

0.0038 to 0.0048 per nm at a wavelength of approximately 1590 nm (L-band application)

It is important not only to compensate the nominal chromatic dispersion of the fiber, but also to minimize the usual manufacturing variability that leads to dispersion non-uniformity along the length of the fiber and between pieces of the same fiber type. Typical commercial production specifications on dispersion at 1550 nm range from +/−0.75 to 1.25 ps/nm/km. Dispersion varies because the final index profile in the fiber varies from the ideal targets, such as those shown in FIGS. 4–9. The impact over many hundreds of kilometers in a transmission system is an accumulated error in dispersion compensation, leading to greater cost expended to trim the dispersion values to specification at the terminals of the system.

It is thus of great advantage to minimize manufacturing variability in dispersion. Most fiber refractive index profile non-idealities originate in the core rod fabrication. However, there are practical techniques to correct certain types of errors prior to the draw process. The present invention facilitates this goal by designing the refractive index profile to have a pattern of sensitivities to core index errors that is suitable to correction by these techniques.

The index profile parameter most susceptible to control by these techniques is the core radius. It is generally impractical or impossible to adjust the refractive index of the core rod after fabrication. However, it is possible to adjust the core diameter at an intermediate stage in the core rod fabrication step sequence prior to overcladding. The latter mechanism is described and claimed in U.S. patent application Ser. No. 09/567,536, filed May 9, 2000, which is incorporated herein by reference.

Thus it is beneficial to determine a set of parameters in which the transmission property of dispersion, the ultimate parameter to be controlled, will vary strongly with core radius, but only weakly with other design parameters.

Generally speaking, assume that Y is a variable denoting an optical property of the fiber, and X is a variable denoting a refractive index profile parameter. The derivative of Y with respect to X, denoted $\partial Y/\partial X$, indicates the sensitivity of fiber property Y to the index parameter X. The objective is for dispersion to vary more strongly with core radius than with any other index profile parameter, and for no other optical property to be strongly dependent on core radius. Thus:

$\partial D/\partial w_1 > 4 \times \partial Y/\partial X$, where X ≠ outer radius of core region where D denotes dispersion and $w_1$ denotes outer radius of the fiber core region. With this condition in place, the core radius can be adjusted as mentioned to effectively control the dispersion characteristics of the optical fiber without introducing variation along the fiber into other target optical properties, such as dispersion slope or mode field. At the same time it is desired that other properties, such as refractive index in the core, have substantially less effect. The condition of relatively high dependence of dispersion D on core radius $a_1$ may be expressed, as just stated, as the ratio $\partial D/\partial r$, where, with D in ps/nm-km and r in microns, the ratio desired is at least 5 and preferably 10 or more.

Examples of index profiles meeting the requirements of the invention are shown in FIGS. 4–8. The profiles are shown as preform design profiles (the preform OD is typically 63 mm). However, optical fibers produced from these preforms essentially replicate these profiles, but with smaller dimensions. In all cases, the properties of optical fibers produced using these preforms fall within the following prescription:

Dispersion at 1550 nm: 7.3+/−1.0 ps/nm-km

Dispersion slope at 1550 nm: <0.042 ps/nm²-km, 0.041 typical

Effective area at 1550 nm: 54–62 $\mu m^2$

Cable cutoff wavelength: <1410 nm

Microbend loss (32 mm) at 1625 nm: <5×10³ dB/km

Zero dispersion wavelength: <1400 nm

Figure 4:
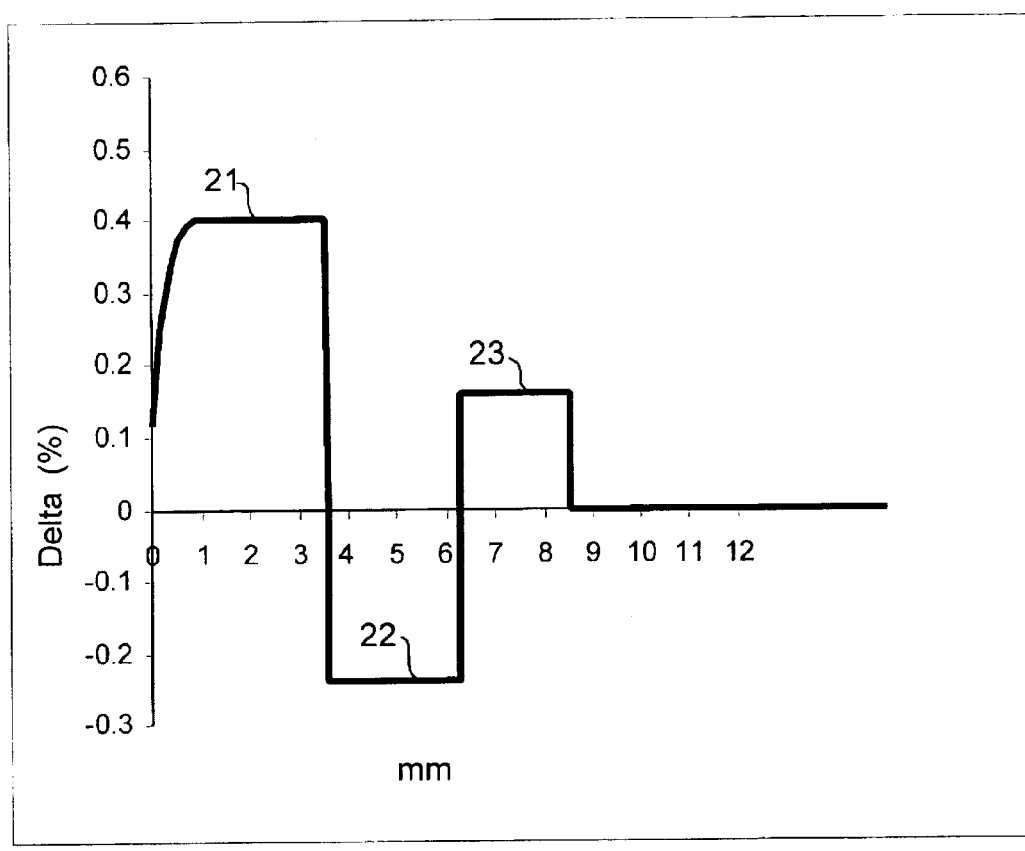
FIGS. 4–9 are optical fiber profile designs according to the invention.
Figure 5:
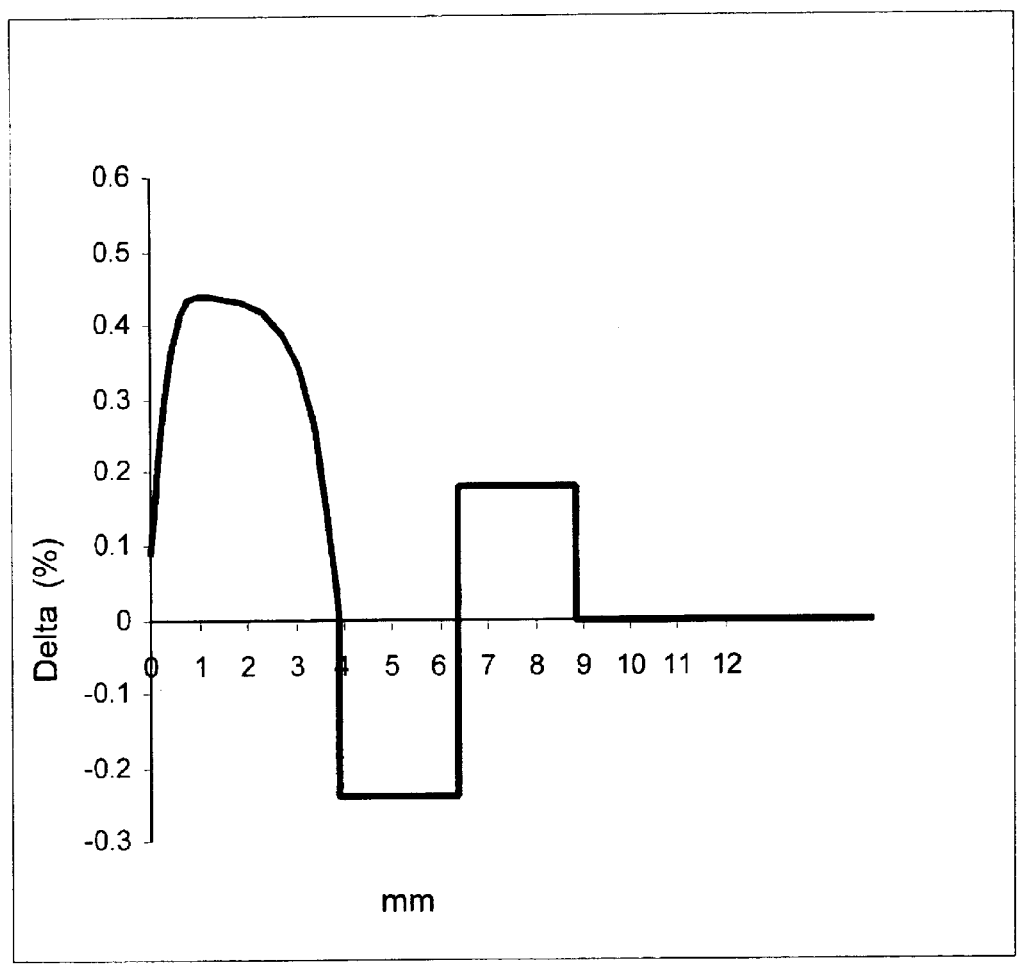
Figure 6:
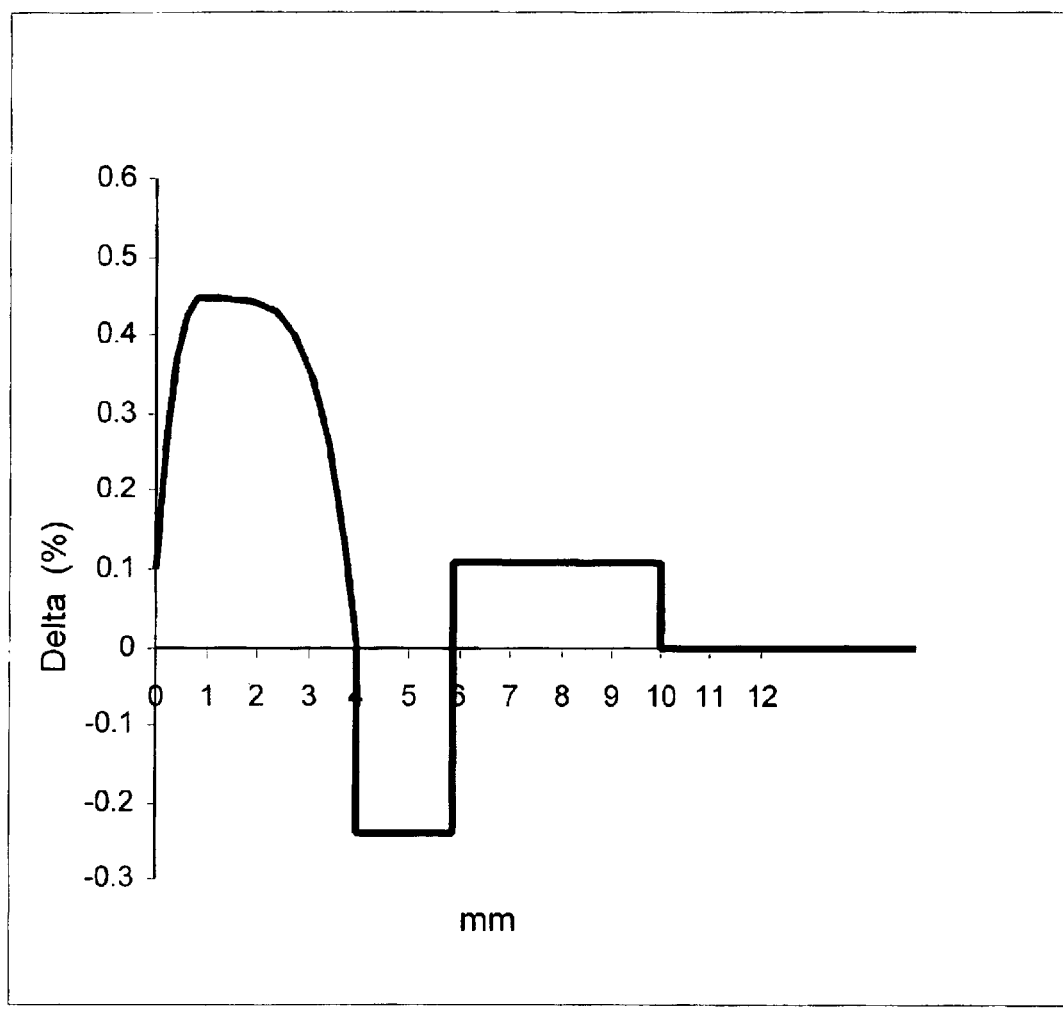
Figure 7:
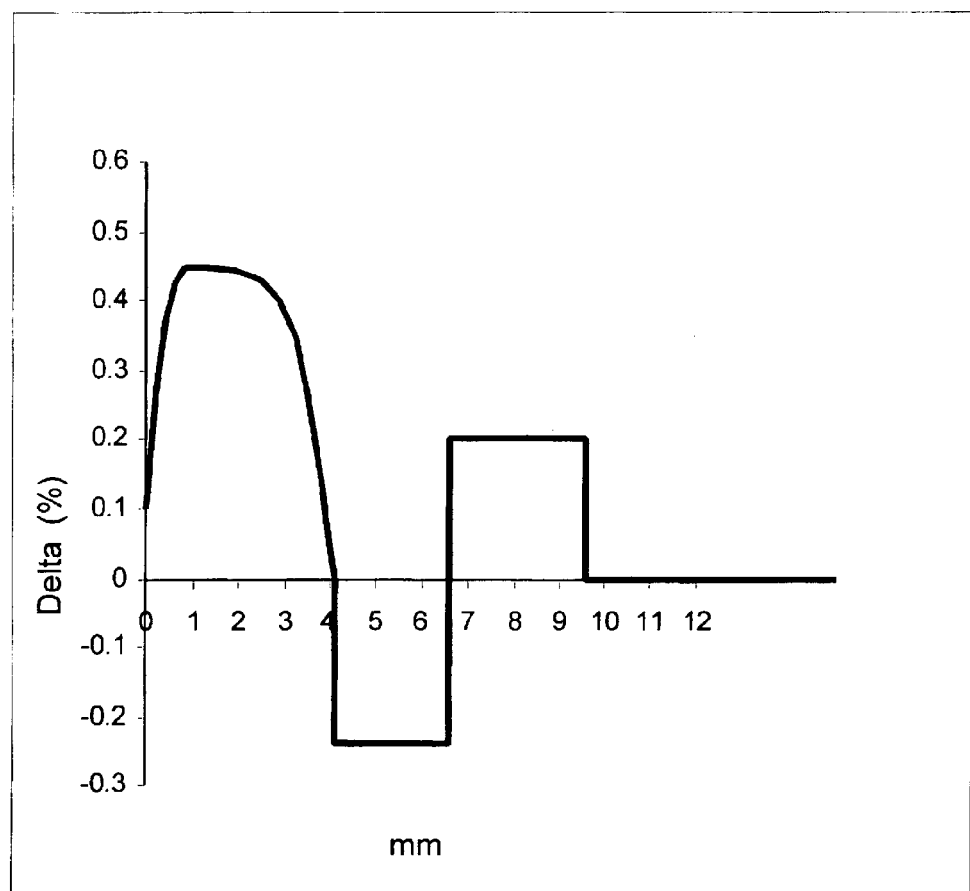
Figure 8:
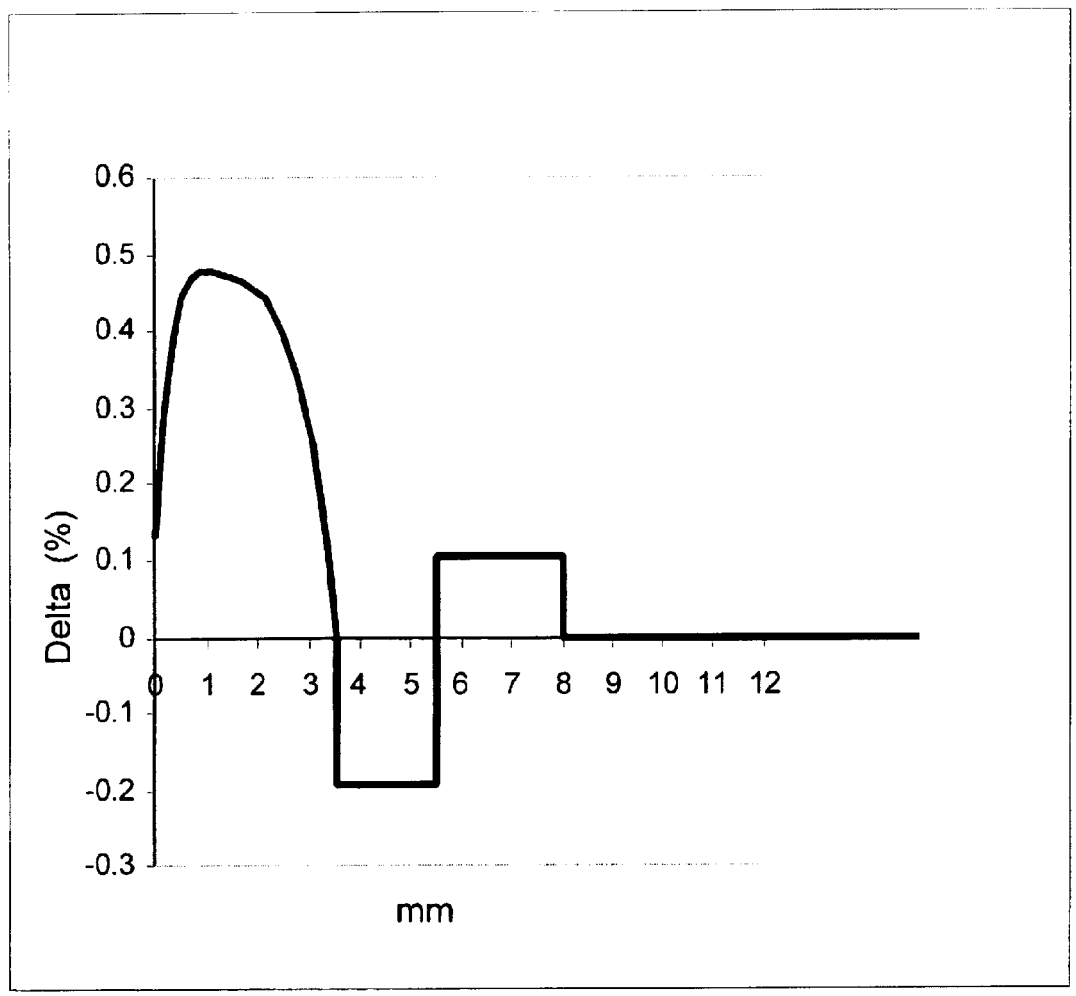

The optical fiber profiles basically comprise four regions. These are shown in FIG. 4, for example, as core region 21, trench region 22, ring region 23 and cladding 24.

Core Region

The core consists of a raised index region extending from the central axis of the preform to radius a, with the radial variation of the normalized index difference, Δr, described by the equation:

$$\Delta r = \Delta(1-(r/a)^\alpha) - \Delta_{dip}((b-r)/b)^\gamma \qquad (1)$$

where r is the radial position,

Δ is the normalized index difference on axis if $\Delta_{dip}=0$, a is the core radius, α is the shape parameter, $\Delta_{dip}$ is the central dip depth, The parameters $\Delta_{dip}$, b, and γ, i.e. the central dip depth, b the central dip width, and the central dip shape are artifacts of MCVD production methods, and these factors may be used when MCVD methods are the production choice for the optical fiber preform. When using other preform fabrication techniques, for example VAD, there will be no central dip.

The equation describing the core shape consists of the sum of two terms. The first term generally dominates the overall shape and describes a shape commonly referred to as an alpha profile. The second term describes the shape of a centrally located index depression (depressed relative to the alpha profile). The core region generally consists of silica doped with germanium at concentrations less than 10 wt % at the position of maximum index, and graded with radius to provide the shape described by equation (1).

Nominal values for the above parameters that yield fiber with the desired transmission properties are:

Δ=0.50%, a=3.51 $\mu$m, α=12, $\Delta_{dip}$=0.35%, b=1.0 $\mu$m, γ=3.0

In general, the range of variation for these parameters may be:

Δ=0.30~0.70% a=2.0~4.5 $\mu$m

α=1~15

The Trench Region

The trench region is an annular region surrounding the core region with an index of refraction that is less than that of the $SiO_2$ cladding. The index of refraction in this region is typically approximately constant as a function of radius, but is not required to be flat. The trench region generally consists of $SiO_2$, doped with appropriate amounts of fluorine and germania to achieve the desired index of refraction and glass defect levels.

The nominal trench parameters are:

Δ=−0.21% and width=2.51 $\mu$m.

In general, the range of variation for these parameters may be:

$\Delta = -0.25 \sim -0.10\%$ $a = 4.0 \sim 8.0 \ \mu m$

The Ring Region

The ring region is an annular region surrounding the trench region with an index of refraction that is greater than that of the $SiO_2$ cladding. The index of refraction in this region is typically constant as a function of radius, but is not required to be flat. The ring region generally consists of $SiO_2$, doped with appropriate amounts of germania to achieve the desired index of refraction.

The nominal ring parameters are:

$\Delta = 0.18\%$ and width = $2.0 \ \mu m$

In general, the range of variation for these parameters may be:

$\Delta = -0.10 \sim -0.60\%$ $a = 7.0 \sim 10.0 \ \mu m$

The Cladding Region

The cladding region is an annular region surrounding the ring, usually consisting of undoped $SiO_2$. However, internal to the cladding region may also exist an additional region of fluorine doped glass, of the appropriate index level and radial dimensions, to improve bending loss characteristics. The cladding region generally extends to 62.5 $\mu m$ radius.

Figure 9:
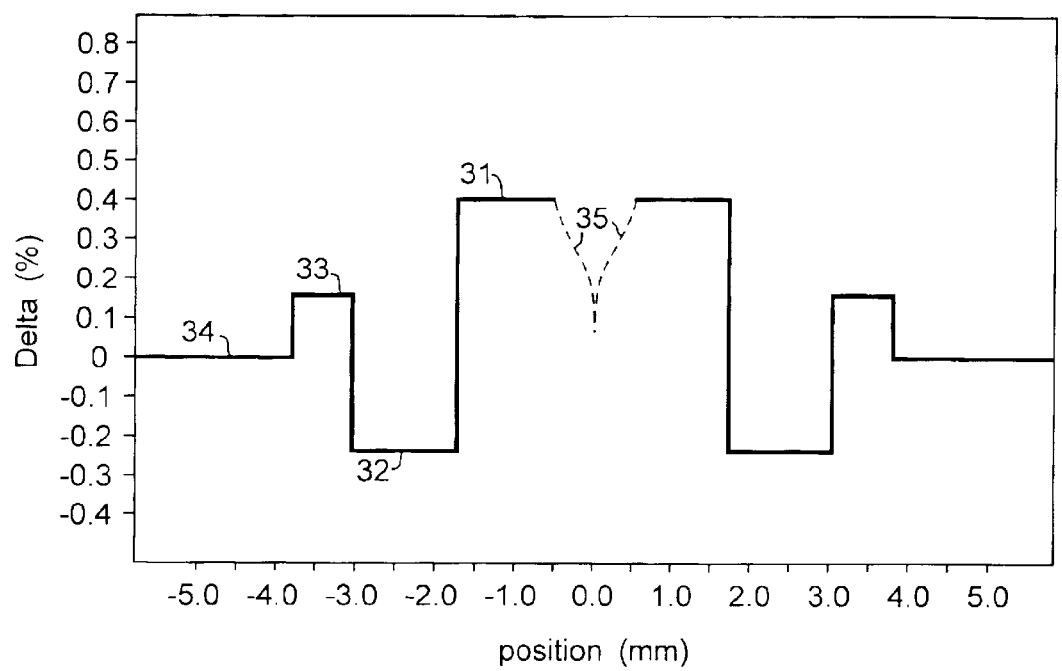

An idealized preform profile meeting the requirements of the invention is shown in FIG. 9. Here the core region is shown at 31, the trench region at 32, the ring region at 33, and the undoped cladding at 34. The characteristic center dip, not an ideal feature, is represented by the dashed lines 35.

The variations of the major transmission properties over the variation of the index profile parameters for this design are as follows:

|  | (f = D) df (df/f × 100) | (f = Aeff) df (df/f/ × 100) | (f = DS) df (df/f/ × 100) |
|---|---|---|---|
| df/dN1 | 0.40(5.6) | −1.237(−2.2) | 0.000(−0.7) |
| df/dW1 | 1.56(22.2) | −0.017(0.0) | 0.001(1.6) |
| df/dN2 | 0.16(2.3) | 0.497(0.9) | 0.001(3.0) |
| df/dW2 | 0.05(0.7) | −0.580(−1.0) | −0.001(−3.6) |
| df/dN3 | −0.17(−2.4) | 0.380(0.7) | 0.000(0.9) |
| df/dW3 | −0.19(−2.7) | 0.301(0.5) | 0.000(0.1) | dD/dW = change in D resulting from a 0.1 micron change in width (W)
dD/dN = change in D resulting from a 0.0001 change in relative delta (N)
D = dispersion at 1550 nm
Aeff = effective area at 1550 nm
DS = dispersion slope at 1550 nm It is evident that the core radius is the dominant parameter that affects the transmission property of dispersion, while variations in other profile parameters do not have as much effect. This means that an intelligent core diameter adjustment to the fabricated rod may be applied, after it is measured, to correct errors in the profile. Such adjustments may result in improved manufacturing yields, lower costs, and better system performance. The choice of 0.1 micron width variation and 0.0001 as the scale for index variation in this example places the derivatives with respect to these two different parameters on equal footing for comparison, since these levels of variation correspond to the typical standard deviations for real manufactured fibers.

It is also evident that the manufacturing expedient just described, i.e. adjusting core diameter during preform manufacture, is applicable to a rod-in-tube preform manufacturing process. Those skilled in the art may develop techniques for adjusting core diameter in other manufacturing techniques, but making the adjustment in a rod-in-tube process is the preferred case. This approach also allows the core and inner cladding regions to be formed using MCVD, a preferred choice from the standpoint of quality and performance of the finished fiber.

Figure 10:
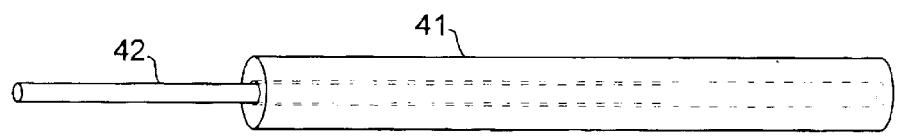
FIGS. 10 and 11 are schematic representations of a rod-in-tube process for the manufacture of optical fiber preforms.
Figure 11:
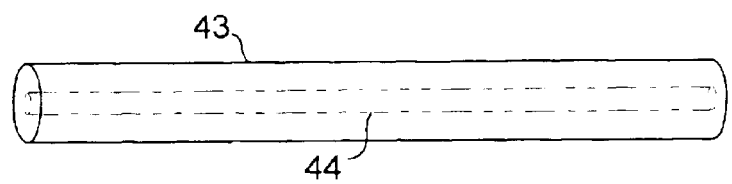

Typical rod-in-tube methods are described in conjunction with FIGS. 10 and 11. It should be understood that the figures referred to are not necessarily drawn to scale. A cladding tube representative of dimensions actually used commercially has a typical length to diameter ratio of 10–15. The core rod 42 is shown being inserted into the cladding tube 41. The tube 41 may represent a single tube or several concentric tubes. The rod at this point is typically already consolidated. The tube may be already consolidated or still porous. Normally, there exist several common options for the make-up of the core rod. It may be just the center core, or it may include one or more of the layers 32, 33 in FIG. 9. In the embodiment of the invention where the rod consists of just the core, 31 in FIG. 9, the remaining doped layers may be formed by one or more cladding tubes. Cladding tubes made with very high quality glass-forming techniques may be used for trench and ring layers, as well as the cladding layers.

After assembly of the rod 42 and tube 41, the combination is sintered to produce the final preform 43, shown in FIG. 11, with the core rod 44 indistinguishable from the tube or tubes except for a small refractive index difference. This may occur either prior to or during the draw process.

Since the rod 42 either has only the core region, or contains the core region, the diameter of the core region may be adjusted before insertion in the tube. The adjustment is determined by measuring of the optical characteristics of the core rod to find the actual deposited core radius characterizing region 31 in FIG. 9, and calculating the difference between the actual and desired core radius. The desired core radius may be taken from one of the profiles shown in FIGS. 4–8.

Figure 12:
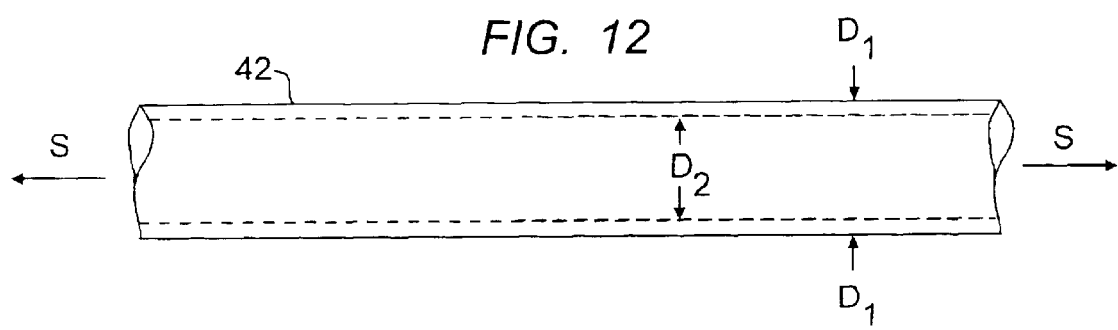
FIG. 12 is a schematic representation of the step of adjusting the core diameter according to the invention.

The core adjustment step is represented by FIG. 12, where the rod 42, with initial diameter $D_1$, is processed to change the rod diameter and produce a rod with diameter $D_2$. Diameter $D_2$ is the desired core rod outer diameter, which produces the correct diameter of deposited core (region 31 in FIG. 9). The diameter change may be produced by any suitable method. The outer core material may be removed by machining or by plasma etching. In a preferred embodiment, the diameter of the core region of the rod is modified by traversing the rod with a plasma torch with the rod under longitudinal stress. This step is procedurally similar to that used in standard MCVD for tube collapse, and is well known in the art. The stress may be compressive or tensile, depending on the result of the measurement just described. This produces a strain $\Delta L$ in the rod length L. Since the amount of material in the rod is fixed, any strain $\Delta L$ will produce a change in the core diameter. In the case illustrated in FIG. 12, the core radius is reduced from $D_1$ to $D_2$ by stress S applied in a tensile mode.

For optimum preform manufacture, essentially all of the preforms will be processed to "trim" the core diameter to the values of the specification. The method involves preparing a "conditional" rod, with diameter $D_1$, measuring the conditional rod to determine the rod diameter adjustment value $(D_1-D_2)$, making the adjustment, and completing the rod-in-tube method. In some cases variations in optical properties along the length of the rod will be found. These may be corrected by changing the stress on the rod as the plasma traverses the length of the rod, or by changing the plasma torch conditions, or traverse speed, during traverse.

When the method used for core diameter adjustment involves removal of material from the outer surface of the rod (for example, the shell region represented by $D_1$–$D_2$ in FIG. 10) and it is anticipated that all rods will require adjustment, the diameter $D_1$ is preferably made deliberately larger than the specification, to eliminate the possibility of producing undersized rods. If the rod is undersized, the rod diameter cannot be corrected by material removal. However, even in that event, preform rods can be salvaged by depositing additional core material on the undersized rod.

It should be mentioned that plasma treatment of core rods is desirable, in addition to being the method of choice for diameter adjustment by stretching/compression, because at least some material will be removed from the outer surface of the core rod. This surface typically is contaminated with OH$^-$ and removing the contaminant by plasma treatment is desirable regardless of other processing choices.

Figure 13:
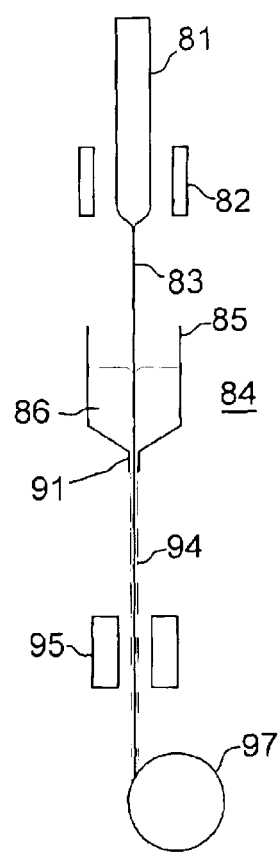
FIG. 13 is a schematic representation of a fiber drawing apparatus useful for drawing preforms made by the invention into continuous lengths of optical fiber.

The optical fiber preform, as described above, is then used for drawing optical fiber. FIG. 13 shows an optical fiber drawing apparatus with preform 81, and susceptor 82 representing the furnace (not shown) used to soften the glass preform and initiate fiber draw. The drawn fiber is shown at 83. The nascent fiber surface is then passed through a coating cup, indicated generally at 84, which has chamber 85 containing a coating prepolymer 86. The liquid coated fiber from the coating chamber exits through die 91. The combination of die 91 and the fluid dynamics of the prepolymer controls the coating thickness. The prepolymer coated fiber 94 is then exposed to UV lamps 95 to cure the prepolymer and complete the coating process. Other curing radiation may be used where appropriate. The fiber, with the coating cured, is then taken up by take-up reel 97. The take-up reel controls the draw speed of the fiber. Draw speeds in the range typically of 1–30 m/sec. can be used. It is important that the fiber be centered within the coating cup, and particularly within the exit die 91, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus of FIG. 13 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 $\mu$m in diameter, with approximately 245 $\mu$m standard.

It should be emphasized that, while the invention has been described largely in the context of MCVD and rod-in-tube processing, the actual method used to achieve the results that form a basis for one aspect of the invention may be selected from a wide variety of choices. These include, but are not limited to, the use of OVD, VAD, PCVD, POVD, MCVD and combinations thereof; the use of different refractive index profiles to achieve the end properties claimed, and other similar alternatives. These and other additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. Method for the manufacture of optical fiber comprising:
   (a) preparing an optical fiber preform,
   (b) heating the preform to the softening temperature, and
   (c) drawing an optical fiber from the preform,
   the invention characterized in that the optical fiber comprises seguential regions of:
   (i) a core region extending from the center of the optical fiber, with essentially all of the core region having a positive $\Delta$,
   (ii) a trench region, with essentially all of the trench region having a negative $\Delta$,
   (iii) a ring region having a positive $\Delta$,
   the optical fiber having the following properties:
   Dispersion at 1550 nm: 5–8.5 ps/nm-km
   Dispersion slope at 1550 nm: <0.045 ps/nm$^2$-km
   Effective area at 1550 nm: >50 $\mu$m$^2$
   Cable cutoff wavelength: <1410 nm
   Macrobend loss (32 mm) at 1625 nm: <5×10$^3$ db/km
   Zero dispersion wavelength: <1400 nm.

2. The method of claim 1 wherein the preform is produced by:
   i. forming a core rod,
   ii. inserting the core rod into a tube,
   iii collapsing the tube around the core rod.

3. The method of claim 2 including the additional steps, after step i., of: measuring the core diameter $D_1$ of the rod, and adjusting the core diameter of the rod to form a rod with diameter $D_2$.

4. The method of claim 3 wherein the diameter is adjusted by exposing the rod to a plasma torch.

5. The method of claim 4 including the additional step of applying stress to the rod while exposing the rod to a plasma torch.

6. The method of claim 3 wherein the diameter is adjusted by removing glass material from the outside of the rod.

7. The method of claim 6 wherein the glass material is removed by mechanical grinding.

8. The method of claim 6 wherein the glass material is removed by plasma etching.

9. The method of claim 1 wherein:
   Dispersion at 1550 nm=7.3+/−2 ps/nm-km
   Effective area at 1550 nm=54–59 $\square$m$^2$
   Dispersion slope at 1550 nm: <0.042 ps/nm$^2$-km.

10. The method of claim 1 wherein the optical fiber has a core radius r, and the derivative of the dispersion D of the optical fiber with respect to the core radius of the optical fiber, $\partial D/\partial r$, is larger than a corresponding derivative D of the refractive index of the core.

11. The method of claim 10 wherein $\partial D/\partial r$ is at least 4× larger than other derivatives.

* * * * *